(12) United States Patent
Tian et al.

(10) Patent No.: US 9,008,397 B2
(45) Date of Patent: Apr. 14, 2015

(54) TOMOGRAPHY SYSTEM BASED ON CERENKOV LUMINESCENCE

(75) Inventors: Jie Tian, Beijing (CN); Jianghong Zhong, Beijing (CN); Xin Yang, Beijing (CN); Chenghu Qin, Beijing (CN)

(73) Assignee: Institute of Automation, Chinese Academy of Science, Beijing (CN)

( * ) Notice: Subject to any disclaimer, the term of this patent is extended or adjusted under 35 U.S.C. 154(b) by 0 days.

(21) Appl. No.: 13/519,863

(22) PCT Filed: Dec. 23, 2010

(86) PCT No.: PCT/CN2010/002141
§ 371 (c)(1),
(2), (4) Date: Aug. 9, 2012

(87) PCT Pub. No.: WO2012/083503
PCT Pub. Date: Jun. 28, 2012

(65) Prior Publication Data
US 2013/0259339 A1    Oct. 3, 2013

(51) Int. Cl.
G06K 9/00 (2006.01)
G01T 1/22 (2006.01)
G06T 11/00 (2006.01)

(52) U.S. Cl.
CPC ................ G01T 1/22 (2013.01); G06T 11/003 (2013.01)

(58) Field of Classification Search
None
See application file for complete search history.

(56) References Cited

U.S. PATENT DOCUMENTS

| | | | |
|---|---|---|---|
| 6,518,580 B1 * | 2/2003 | van Bibber et al. | 250/397 |
| 6,552,347 B1 | 4/2003 | Dimcovski | |
| 8,465,200 B2 * | 6/2013 | Sun | 374/44 |
| 2012/0220870 A1 * | 8/2012 | Gambhir et al. | 600/431 |
| 2013/0058195 A1 * | 3/2013 | Cloutier et al. | 367/99 |
| 2013/0108132 A1 * | 5/2013 | Klose | 382/131 |

FOREIGN PATENT DOCUMENTS

CN    101856220 A    10/2010

OTHER PUBLICATIONS

Cerenkov Luminescence Imaging of Medical Isotopes—Ruggiero et al. pp. 1123-1130—Journal of Nuclear Medicine, published on Jun. 16, 2010, Society of Nuclear Medicine, Inc.
Cerenkov Luminescence Tomography for Small Animal Imaging—Li et al. pp. 1-7—National Institute of Health Public Access—Apr. 1, 2010.
Cerenkov Radiation Allows In Vivo Optical Imaging of Position Emitting Radiotracers—Spinelli et al. Physics in Medicine and Biology, pp. 483-495 Copyright 2010.

* cited by examiner

Primary Examiner — Nancy Bitar
(74) Attorney, Agent, or Firm — Steptoe & Johnson LLP

(57) ABSTRACT

A tomography system based on Cerenkov tomography, comprising:
a detector of Cerenkov fluorescence for acquiring optical plane images;
a structural imaging system for acquiring three-dimensional structural images;
a bed device for supporting an object to be imaged; a computer for forming an optical image, a structural image and a CLT image. The invention adopts the SP3 model and the semi threshold iterator to implement the global reconstruction of the CLT, and obtains the three-dimensional tomography image of the distribution of the radiopharmaceutical and the molecular probe in vivo within a short time. Since ordinary CCD camera is used, the cost of the imaging system has been sharply reduced for the equipment's construct and maintenance compared with PET/SPECT or γ camera. Therefore the present invention expands the options of the molecular probe, and application of the medicine Imaging.

9 Claims, 5 Drawing Sheets

TOMOGRAPHY SYSTEM BASED ON CERENKOV LUMINESCENCE

FIELD OF THE INVENTION

The present invention generally relates to an imaging system. More particularly, the present invention relates to method and system for Cerenkov Luminescence Tomography.

DESCRIPTION OF THE RELATED ART

The propositions of Cerenkov Luminescence Imaging (CLI) establish the foundation of clinical application of molecular imaging. In 2010, A. Ruggiero (J. Nucl. Med. 2010, 51:1123-1130) proved that the high-speed movement of high-energy α or β particles cause Cerenkov Emission, which can result in visible photons. Those photons can penetrate through the object to be imaged and get to the surface. With those photons, the optical imaging system can provide a vivo nuclear medicine image. It means the optical imaging becomes a new mode besides PET (Positron Emission Tomography) and SPECT (Single Photon Emission Computed Tomography).

While CLI can obtain the two-dimensional distribution of the nuclide without the depth information of the radiation source, Spinelli (*Phys. Med. Biol.* 2010,55:483-495) adopt multispectral technology to estimate the depth of the radiation source, but the essence of the method is still single perspective two-dimensional image. Li (*Opt. Lett.* 2010,35: 1109-1111) provides a new method named CLT (Cerenkov Luminescence Tomography) and achieves three-dimensional image based on the assumption of uniformity model. Both of the methods listed above admit the assumption of Diffusion Approximation theory. But actually, the spectrum of Cerenkov Effect is not limited in 300-700 nm, the distribution of the energy is inversely proportional to the square of the wavelength. A complex biological tissue presents characters as below when penetrated by a blue dominated light: the ratio of the optical scattering coefficient and the absorption coefficient is usually less than 10. As a result, the DA model is no long fit to describe the dissemination of the light in body. To improve the quality of the image got by CLT, we have already built and proved the RTE (Radiation Transport Equation) and SP3 (The Third-order Simplified Spherical Harmonics Approximation) model to describe the phenomenon of the Cerenkov photons' dissemination in the body. However, distribution of the radiopharmaceutical in body is partial centralized and global sparse. However it is difficult to have an inverse model for the multiple-peak and sparse global method based on the CLT

SUMMARY OF THE INVENTION

The subject matter of the present invention is to provide a tomography system and a method based on Cerenkov Effect.

According to one aspect of the present invention, a tomography method based on the Cerenkov Tomography Imaging comprising:

Acquiring an optical plane image and a three-dimensional structural image;

Obtaining a space registration of the optical plane image collected by different perspective and the three-dimensional structural image based on fixed marking points, and constructing a geometrical mapping table of the optical and a tomography image;

Converting every pixel's gray value of the optical plane image into an illumination intensity of three-dimensional object based on the geometrical mapping table, and obtaining a distribution B of the illumination intensity on a surface of the object;

Segmenting the three-dimensional tomography image in order to obtain each organ, and the organs being assigned by different pixel values;

The segmented body data being discratized by a finite element method, and outputting a volume gridding;

Based on the SP3 forward model, constructing the linear mapping table between the distribution of the surface light intensity B and the unknown distribution of the isotope in vivo S, B=AS, where A stands for the system parameter matrix of the forward model, B stands for a m-dimensional column vector, S stands for an n-dimensional column vector, m is a signless integrals less than n;

Based on the theory of the $L_{1/2}$ regularization, objective function F(S) being calculated for reconstructing tomography image using iterator as follows: $F(S)=\min\{\|B-AS\|_2 + p\|s\|_{1/2}\}$, where p stands for the parameter of the regularization, $p=(1-\epsilon)/\|A\|^2$;

In the K+1$^{st}$ iterate, the iterator update the distribution of the isotope in vivo. $S_{k+1}=H_{pq}(T_k(S_k))$, $T_k(S_k)=S_k+q_kA^T(B-AS_k)$, where k is a signless integral, $q_k=4|T_k|^{3/2}\|A\|^2/3$, $H=(h(S_1), h(S_2) \ldots h(S_n))^T$, $$h(S) = 2S\left(1 + \cos\frac{2\pi - 2\phi}{3}\right)/3,$$

when $S>\eta(pq)^{3/2}$, $h(S)=0$ and $S\leq\eta(pq)^{3/2}$, $$\phi = \arccos\left(0.125\ pq\left(\frac{|S|}{3}\right)^{-3/2}\right),$$

η stands for a real constant;

If the S got by the kst makes the objective function $F_k<V$, stop the iterator, where V is a threshold constant.

According to other aspect of the present invention, a tomography system based on Cerenkov tomography, comprising:

a detector of Cerenkov fluorescence for acquiring optical plane images;

a structural imaging system for acquiring three-dimensional structural images;

a bed device for supporting an object to be imaged;

a computer for forming an optical image, a structural image and a CLT image.

The invention adopts the SP3 model and the semi threshold iterator to implement the global reconstruction of the CLT, and obtains the three-dimensional tomography image of the distribution of the radiopharmaceutical and the molecular probe in vivo within a short time. Since ordinary CCD camera is used, the cost of the imaging system has been sharply reduced for the equipment's construct and maintenance compared with PET/SPECT or γ camera. Therefore the present invention expands the options of the molecular probe, and application of the medicine Imaging.

DETAILED DESCRIPTION OF PREFERRED EMBODIMENTS

Figure 1:
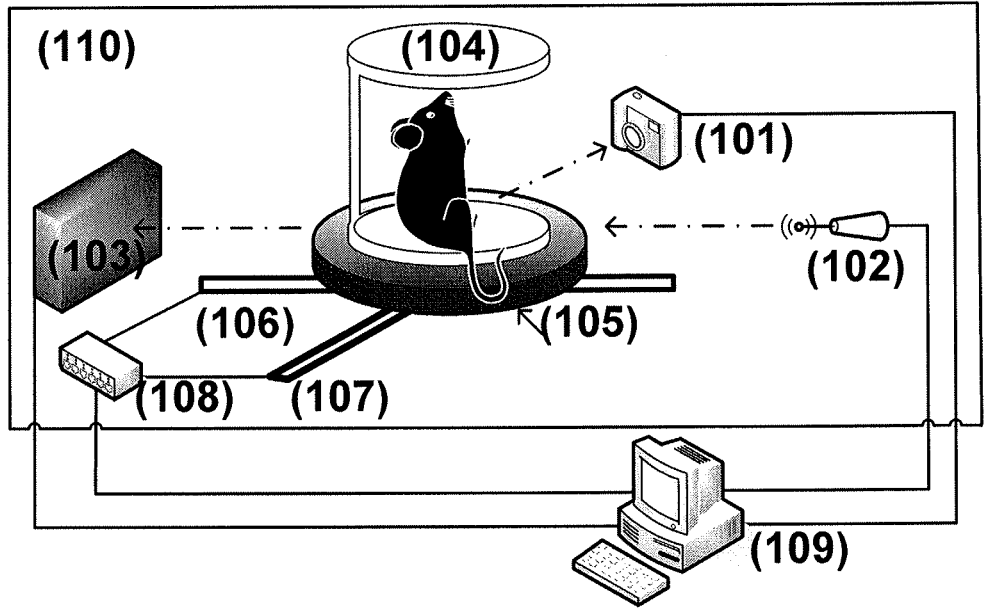
FIG. 1 shows the three-dimensional structure of the system.

As shown in FIG. 1, a Tomography system of the present invention comprises a detector (101) for Cerenkov fluorescence, a computer (109), a camera obscura (110), a structural imaging system (102,103), a bed device (104,105,106,107, 108) which supports a object to be imaged (i.e patient, animal or others), the bed is called a small animal bed. The detector for Cerenkov fluorescence (101) is the key point of the present invention, comprising a CCD camera that works at −110 degree, a band-pass filter bank with a bandwidth ranged from 10 nm to 20 nm and a centre wavelength ranged from 500 nm to 650 nm. The band-pass filter bank is installed on the axis of the stepper motor. There are six optical holes to collect photons of different wave bands. One of them does not have an optical filter plate. The small animal stents (104), which can be detached from the imaging system, has 24 marking point with diameter of 2 mm, which can be recognized by the optical camera and the micro-CT. The bottom of the stents is fixed on the 360-degree rotating platform (105), which has three irrelevant stepper motor. The small animal can change position by the rotating platform and the orthogonal translation guide (106,107). The structural imaging device is a high-resolution micro-CT system, which is orthogonal to the Cerenkov photon detector on the air-cushion optical platform. The front side of the camera obscura (110) is made of lead crystals, the other sides are made of lead plate. The inner face of the camera obscura is cover by blank dope. There is a 1 cm diameter hole on the bottom of the camera obscura, which can let the cable, which connect the controller and the computer, and the pipe of anesthesia gas get through.

Figure 2:
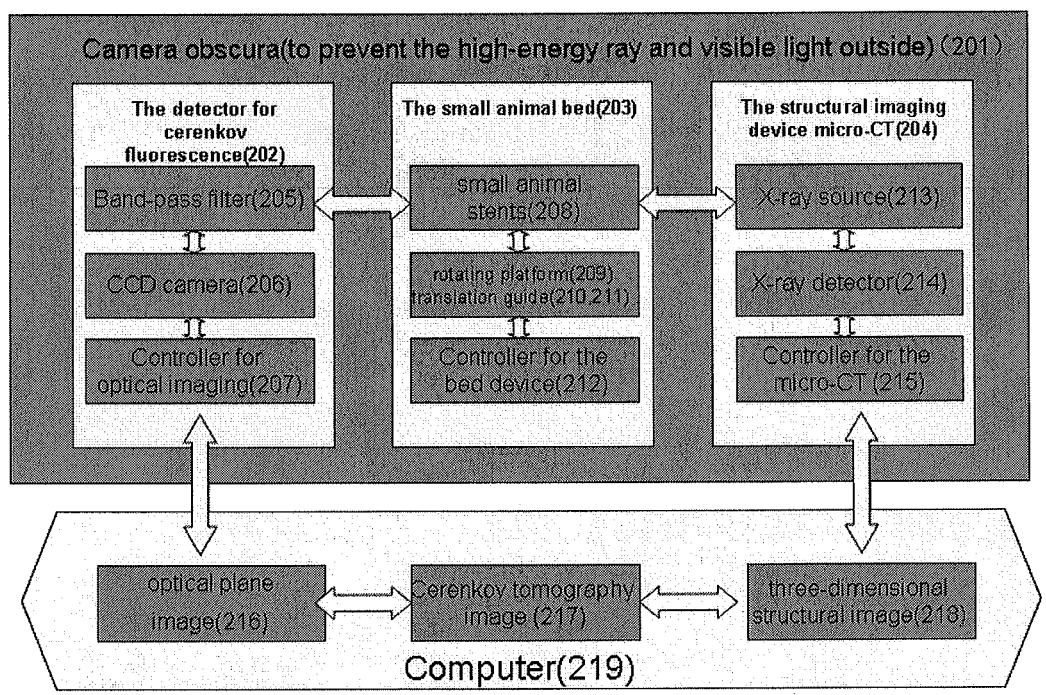
FIG. 2 shows the constitution of the entire invention.

The FIG. 2 shows the frame diagram of the tomography system based on Cerenkov Luminescence. The Cerenkov photon detector (202) comprises a rotating band-pass filter bank (205), a CCD device to convert the optical signal into the electrical signal (206), and an optical imaging controller (207). The optical imaging controller can adjust the bandwidth and the centre wavelength of the band-pass filter bank, the working temperature of the CCD camera, the frequency of the data acquisition, the time of the exposure, and the openness of the aperture by the command of the computer. The small animal bed (203) comprise a small animal stents (208) for fixing the object to be imaged, a 360-degree rotating platform (209), a translation guide (210,211), and a Controller (212). The controller for the bed device (212) can change the position of the object to be imaged based on the command of the computer. The structural imaging system micro-CT (204) comprises a X-ray source (213), a X-ray detector (214), and a micro-CT controller (215). The micro-CT controller can adjust the parameters of the micro-CT system based on the command of the computer. The optical imaging controller (207) delivers the image acquired by the CCD camera to the computer, and obtains the optical plane image (216). The micro-CT controller (215) delivers the three-dimensional data acquired by the X-ray detector to the computer (219), and obtains the three-dimensional structural image (218). The computer calculates the Cerenkov tomography image (217) according to the optical plane image, the three-dimensional structural image, and the reconstruction algorithm. Therefore, the computer outside the camera obscura not only control the whole system, but also process and output the optical plane image (216), three-dimensional structural image (218), and Cerenkov tomography image (217).

Figure 3:
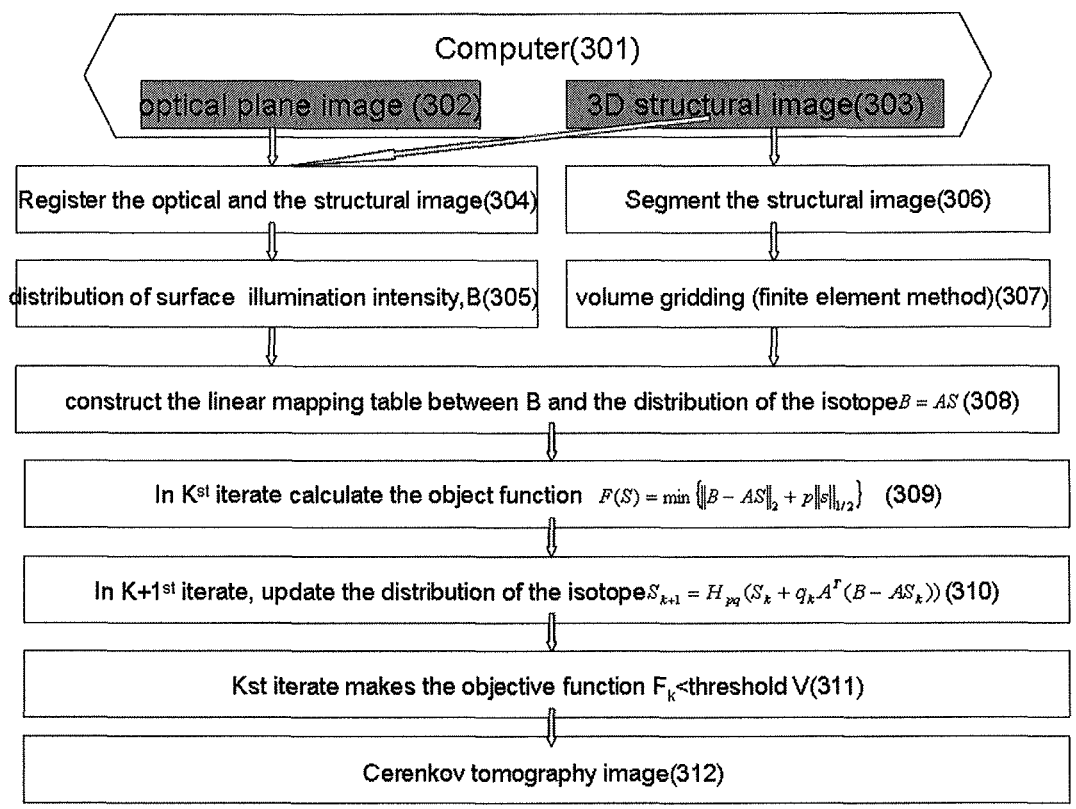
FIG. 3 shows the flow chart of the method to reconstruct the Cerenkov tomography image.

As shown in the FIG. 3, a computer (301) calculates the Cerenkov tomography image (312) according to an optical plane image (302), a three-dimensional structural image (303), and a reconstruction algorithm (the arrows in FIG. 3 show the message passing direction.)

Step 304: obtaining a space registration image of the optical plane image (302) and the three-dimensional structural image (303) based on a fixed marking point, And constructing a geometrical mapping table of the optical and the CT tomography image.

Step 305: Converting every pixel's gray value of the optical plane image into illumination intensity of the three-dimensional object based on the geometrical mapping table acquired by step 304, and obtaining the distribution of the illumination intensity on the surface of the object (B).

Step 306: Segmenting the three-dimensional tomography image acquired by the micro-CT, in order to obtain each organ, and the organs are assigned by different pixel values. For instance, after the image is segmented, we obtain the images of the heart, the kidney, the liver, the skeleton, the muscle, and the bladder, etc.

Step 307: obtaining the volume gridding of the body is dispersed by using the finite element method. For example, a tetrahedron gridding is used.

Step 308: Based on the SP3 forward model, constructing a linear mapping table between the distribution of the surface light intensity B and the unknown distribution of the isotope in vivo S, i.e B=AS, where A stands for the system parameter matrix of the forward model, B stands for a m-dimensional column vector, S stands for an n-dimensional column vector. m and n are signless integral, and m<n.

Step 309: Based on the theory of the $L_{1/2}$ regularization, objective function F(S) is calculated for reconstructing tomography image using iterator as follows: $F(S)=\min\{\|B-AS\|_2+p\|s\|_{1/2}\}$, where p stands for the parameter of the regularization, $p=(1-\epsilon)/\|A\|^2$.

Step 310: In the $K+1^{st}$ iterate, the iterator update the distribution of the isotope in vivo. $S_{k+1}=H_{pq}(T_k(S_k))$, $T_k(S_k)=S_k+q_k A^T(B-AS_k)$, where k is a signless integral, $q_k=4|T_k|^{3/2}\|A\|^2/3$, $H=(h(S_1), h(S_2) \ldots h(S_n))^T$, $$h(S) = 2S\left(1 + \cos\frac{2\pi - 2\phi}{3}\right)\bigg/3,$$

when $S>\eta(pq)^{3/2}$, $h(S)=0$ and $S\leq\eta(pq)^{3/2}$, $$\phi = arcos\left(0.125\ pq\left(\frac{|S|}{3}\right)^{-3/2}\right),$$

η stands for a real constant.

Step 311: If the S got by the kst makes the objective function $F_k<V$ stop the iterator, where V is a threshold constant. Output the final reconstruction image, namely the Cerenkov tomography image (312).

Figure 4:
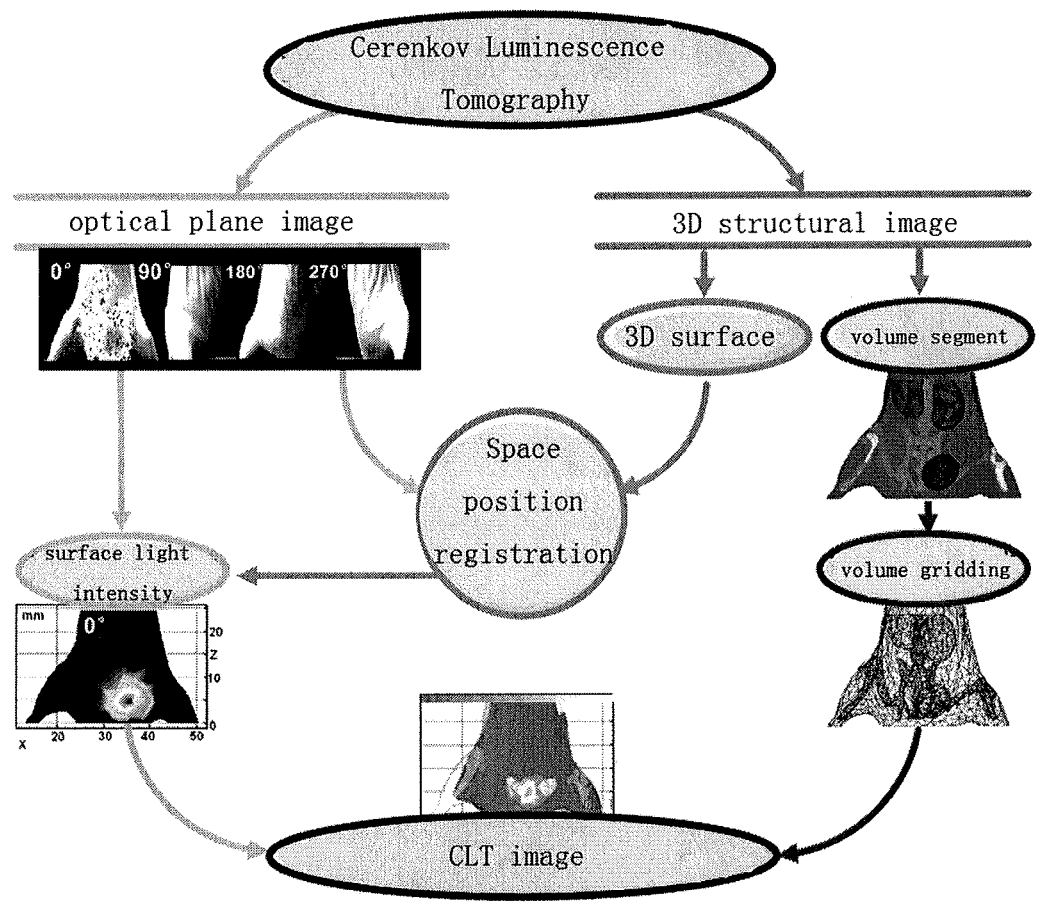
FIG. 4 shows the schematic diagram of the process of the reconstructing the Cerenkov tomography image.

As shown in the FIG. 4, the present invention utilizes 2 fluorine-2 deoxidation-D glucose ($^{18}$F-FDG) to implement tomography image as follows: anaesthetize a femina nu/nu nude mouse, which has a weight of 23 g, with the isoflurane. Inject 0.2 ml of small animal CT contrast medium Fenestra LC, and 1.11 MBp $^{18}$F-FDG into the mouse, and set the parameter of the micro-CT system. Scanning voltage of the X-ray emission source is 50V, the power is 50 W, the integral time of the detector is 0.467 s, the rotational speed of the platform is 1.0°/s, the size of the projected image is 1120×2344, the imaging time is 3.0 s, and the number of the projection is 360. The CT scanning is conducted 30 min after the injection is completed, and acquire the three-dimensional structural image. After setting the parameter of the Cerenkov optical imaging system, CCD camera's time of exposure is set to be 3 min, the F number of the aperture is set to be 2.8, the focal length is 55 mm, the distance between the object to be imaged and the lens is 15 cm, the binning number is 2. Conduct the optical scanning without an optical filter 60 min after injection, acquire the optical image every 90° rotation. After the registering and fusion of the CT tomography image and the optical image, construct the distribution of the illumination intensity on the surface of the object (B), in which, there are 1934 nodes, 3899 dough sheet. After the segment of the volume data, obtain the kidney, the skeleton, the bladder, and the muscle. The geometric centre of the bladder is 34.7 mm, 14.5 mm, and 5.0 mm. Discretize the surface gridding using the finite element method, acquire the tetrahedron gridding with 3952 nodes, 25578 borders, 42471 triangle patch, and 20844 tetrahedrons. After acquiring the distribution of the illumination intensity on the surface and the volume gridding, set the weight of mixture spectrum as the optical parameters of different biological tissues. According to the reconstruction method, reconstruct the CLT image, get the distribution of the medical isotopes in vivo.

Figure 5:
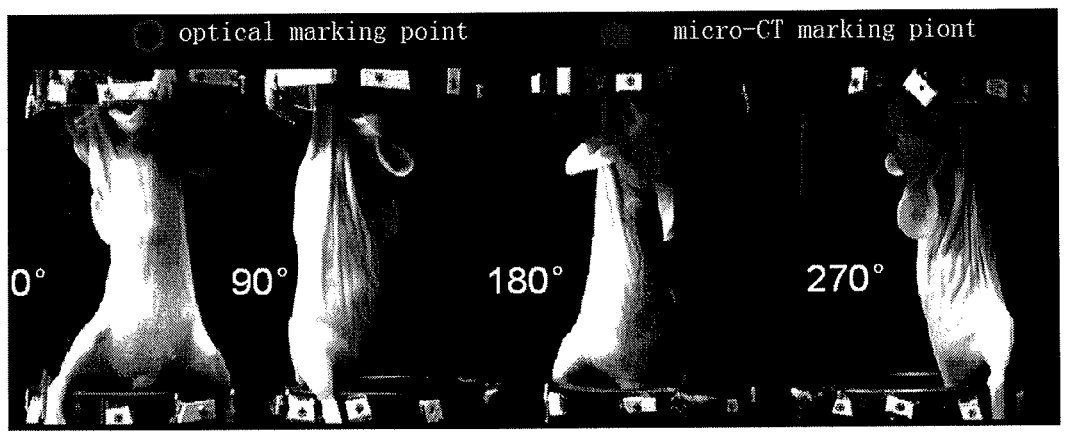
FIG. 5 shows the registering relational graph of the optical and the structural image.

The FIG. 5 shows the distance errors of the registering of the micro-CT image and the optical image based on the fixed marking point.

Figure 6:
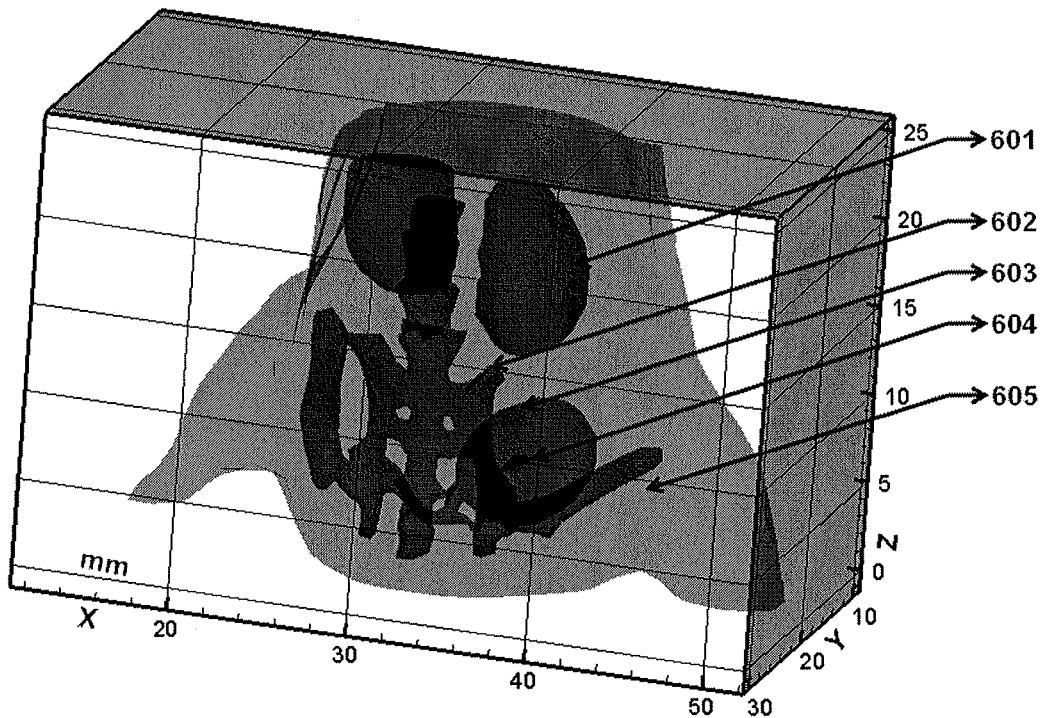
FIG. 6 shows the distribution of the vexels which have the most isotope according to the algorithm of the reconstruction.

The FIG. 6 shows the result of the image segment, while 601 points to the kidney, 602 points to skeleton, 603 points to bladder, 604 points to the vexel that has the most illumination intensity of the fluorescence, 605 points to the muscle. The geometric centre of 604 is (34.4 mm, 13.2 mm, 4.7 mm), in the bladder.

Figure 7:
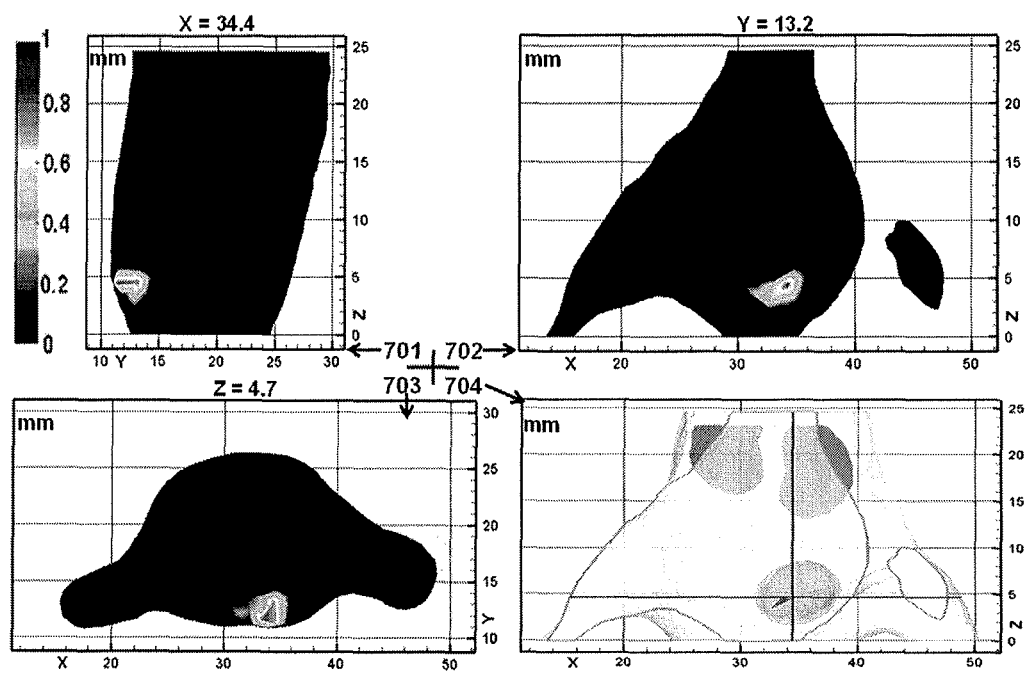
FIG. 7 shows the Cerenkov tomography and the three orthogonal sectional drawing which go through the maximum vexel.

The FIG. 7 shows the distribution of the $^{18}$F-FDG in vivo in the CLT reconstruction image. While 306 is the sectional drawing of X=34.4 mm, 307 is the sectional drawing of Y=13.2 mm, 308 is the sectional drawing of Z=4.7 mm, 309 shows the position of the three sectional drawing listed above in the CLT reconstruction image. The parameter of the CLT reconstruction is η=125. In the sectional drawing of the CLT reconstruction image, the illumination intensity is normalize into [0,1]. The reconstruction time of the whole image is less than 0.65 s. Based on the assumption of FDG is uniform in bladder, the reconstruction errors is 1.4 mm.

The present invention can achieve the three-dimensional imaging of radiopharmaceutical in vivo, provide a low cost molecular imaging method for clinical application.

The foregoing exemplary embodiments and advantages are merely exemplary and are not to be construed as limiting the present invention. The present teaching can be readily applied to other type of apparatus. Also the description of the exemplary embodiments of the present invention is intended to be illustrative, and alternatives, modifications, and variations will be apparent to those skilled in the art.

The invention claimed is:

1. A method of tomography based on Cerenkov Effect, comprising:
   acquiring optical plane images and three-dimensional tomography structural images of a three-dimensional object in multiple viewpoints;
   executing spatial registration between the optical plane images acquired in multiple viewpoints and corresponding three-dimensional tomography structural images based on fixed marking points as to generate a geometrical mapping table of an optical image—a tomography image;
   converting a gray value of each of the pixels in the optical plane image into an illumination intensity of a surface on the three-dimensional object based on the geometrical mapping table, and obtaining a distribution B of the illumination intensity;
   segmenting the three-dimensional tomography structural image for multiple organs of the object, and assigning corresponding pixel values to each of the multiple organs to generate volume data;
   executing discretization on the volume data by a finite element method, and outputting a volume gridding;
   establishing a linear mapping table between the distribution B and a distribution S of unknown isotopes S of the object based on a SP3 forward model, B=AS, where A is a system parameter matrix of the SP3 forward model, S is a n-dimensional column vector, m and n are positive integers, and m<n;
   calculating an objective function F(S) based on a $L_{1/2}$ regularization theory, as to reconstruct a tomography image using an iteration as: F(S)=min{||B−AS||$_2$+p||s||$_{1/2}$}, where p is a parameter for the regularization, p=(1−ϵ)/||A||$^2$,
   wherein calculating the objective function F(S) comprises:
   in a K+1$^{st}$ iteration, updating the distribution S as
   $S_{k+1}=H_{pq}(T_k(S_k))$, $T_k(S_k)+q_kA^T(B-AS)$, where k is a positive integer, $q_k=4|T_k|^{3/2}||A||^2/3$, H=(h(S$_1$), h(S$_2$) . . . h(S$_n$))$^T$ $$h(S) = 2S\left(1 + \cos\frac{2\pi - 2\phi}{3}\right)/3,$$

when S>η(pq)$^{3/2}$, h(S)=0 and S≤ηpq)$^{3/2}$, $$\phi = \arccos\left(0.125\ pq\left(\frac{|S|}{3}\right)^{-3/2}\right),$$

η is a real constant; and
   stopping the iteration if the updated S makes the objective function $F_k$<V, where V is a predetermined threshold.

2. A tomography imaging system based on Cerenkov Effect, comprising:
   a detector of Cerenkov Luminescence emitted from radiopharmaceutical configured to acquire optical plane images of an object to be imaged;
   a structural imaging system configured to acquire three-dimensional tomography structural images of the object to be imaged;
   a bed device for supporting the object to be imaged; and
   a computer configured to obtain a tomography image of the object using the optical plane images and the three-dimensional tomography structural images acquired;

wherein the computer is configured to:
execute spatial registration between the optical plane images acquired in multiple viewpoints and corresponding three-dimensional tomography structural images based on fixed marking points as to generate a geometrical mapping table of an optical image-a tomography image;
convert a gray value of each of the pixels in the optical plane image into an illumination intensity of a surface on the object based on the geometrical mapping table, and obtain a distribution B of the illumination intensity;
segment the three-dimensional tomography structural image for multiple organs of the object, and assign corresponding pixel values to each of the multiple organs to generate volume data;
execute discretization on the volume data by a finite element method, and output a volume gridding;
establish a linear mapping table between the distribution B and a distribution S of unknown isotopes of the object based on a SP3 forward model, B=AS, where A is a system parameter matrix of the SP3 forward model, B is a m-dimensional column vector, S is a n-dimensional column vector, m and n are positive integers, and m<n;
calculate an objective function F(S) based on a $L_{1/2}$ regularization theory, so as to reconstruct a tomography image of the object using an iteration as $F(S)=\min\{\|B-AS\|_2+p\|s\|_{1/2}\}$, where p is a parameter for the regularization, $p=(1-\epsilon)/\|A\|^2$;
wherein the computer is further configured to:
in a $K+1^{st}$ iteration, update the distribution S as $S_{k+1}=H_{pq}(T_k(S_k))$, $T_k(S_k)=S_k+q_kA^T(B-AS_k)$, where k is a positive integer, $q_k=4|T_k|^{3/2}\|A^2/3$, $H=(h(S_1), h(S_2)\ldots h(S_n))^T$, $$h(S) = 2S\left(1+\cos\frac{2\pi-2\phi}{3}\right)/3,$$

when $S>\eta(pq)^{3/2}$, h(S)=0 and $S\leq\eta(pq)^{3/2}$, $$\phi = ar\cos\left(0.125\ pq\left(\frac{|S|}{3}\right)^{-3/2}\right),$$

η is a real constant; and
stop the iteration if the updated S makes the objective function $F_k<V$, where V is a predetermined threshold.

3. The system according to claim 2, wherein the detector of the Cerenkov Luminescence comprises a low temperature CCD camera.

4. The system according to claim 2, wherein the object to be imaged is a patient or a small animal.

5. The system according to claim 2, wherein the detector of the Cerenkov Luminescence comprises an optical imaging controller configured to control a rotation of a band-pass filter bank and a CCD camera configured to an optical signal into an electrical signal.

6. The system according to claim 2, wherein the bed device comprises a bed device controller configured to control a position of the object with respect to the detector by using a turntable and an orthogonal guide.

7. The system according to claim 2, wherein the structural imaging system comprises an X-ray source, an X-ray detector and a controller.

8. The system according to claim 2, wherein the structural imaging device is orthogonal to the detector on an air-cushion optical platform.

9. The system according to claim 2, further comprising a camera obscura accommodating the structural imaging device, the detector and the bed device.

* * * * *

UNITED STATES PATENT AND TRADEMARK OFFICE
CERTIFICATE OF CORRECTION

PATENT NO. : 9,008,397 B2  
APPLICATION NO. : 13/519863  
DATED : April 14, 2015  
INVENTOR(S) : Jie Tian et al.

Page 1 of 1

It is certified that error appears in the above-identified patent and that said Letters Patent is hereby corrected as shown below:

On the Title Page, item (54) and in the Specification, Column 1, In line 1, insert --A-- before "TOMOGRAPHY"

In the Specification

Column 3, In line 57, replace "Control-" with --control- --

Signed and Sealed this  
Twenty-second Day of September, 2015

Michelle K. Lee  
*Director of the United States Patent and Trademark Office*